US009376026B2

(12) United States Patent
Keeling et al.

(10) Patent No.: US 9,376,026 B2
(45) Date of Patent: Jun. 28, 2016

(54) SYSTEM AND METHOD FOR INDUCTANCE COMPENSATION IN WIRELESS POWER TRANSFER

(71) Applicant: QUALCOMM Incorporated, San Diego, CA (US)

(72) Inventors: Nicholas A. Keeling, Auckland (NZ); Mickel Budhia, Auckland (NZ); Hanspeter Widmer, Wohlenschwil (CH); Marcel Fischer, Boniswil (CH); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 13/937,154

(22) Filed: Jul. 8, 2013

(65) Prior Publication Data
US 2014/0111151 A1 Apr. 24, 2014

Related U.S. Application Data

(60) Provisional application No. 61/716,395, filed on Oct. 19, 2012, provisional application No. 61/791,882, filed on Mar. 15, 2013.

(51) Int. Cl.
*H02J 7/00* (2006.01)
*B60L 11/18* (2006.01)
(Continued)

(52) U.S. Cl.
CPC .............. *B60L 11/182* (2013.01); *H01F 38/14* (2013.01); *G05F 1/14* (2013.01);
(Continued)

(58) Field of Classification Search
CPC .............. H02J 7/025; H02J 5/005; G05F 1/14
USPC .......... 320/107–109; 361/93.6, 93.9; 307/104
See application file for complete search history.

(56) References Cited

U.S. PATENT DOCUMENTS 6,515,878 B1 2/2003 Meins et al.
8,764,550 B2 * 7/2014 Thacker .............. G07F 17/3244
463/16

(Continued)

FOREIGN PATENT DOCUMENTS

EP 2309522 A1 4/2011
JP 2008087733 A 4/2008
(Continued)

OTHER PUBLICATIONS

International Search Report and Written Opinion—PCT/US2013/064858—ISA/EPO—Oct. 2, 2014.

*Primary Examiner* — Stacy Whitmore
(74) *Attorney, Agent, or Firm* — Knobbe, Martens, Olson & Bear, LLP

(57) ABSTRACT

This disclosure provides systems, methods and apparatus for wireless power transfer. In one aspect an apparatus for wirelessly transferring power from a charging power source to a device is provided. The apparatus includes a first strand wound in one or more turns and operationally coupled to the charging power source and a second strand wound together with the first strand in one or more turns and operationally coupled to the charging power source. The apparatus further includes an inductor circuit connected to the first strand and disconnected from the second strand. The inductor circuit is further configured to reduce a current difference between a first current flowing through the first strand and a second current flowing through the second strand.

51 Claims, 18 Drawing Sheets

(51) Int. Cl.
  *H01F 38/14*    (2006.01)
  *G05F 1/14*     (2006.01)
  *H02J 5/00*     (2016.01)
  *H02J 7/02*     (2016.01)
  *H01F 27/34*    (2006.01)

(52) U.S. Cl.
  CPC .......... *H01F 2027/348* (2013.01); *H02J 5/005* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2003/0229982 A1* | 12/2003 | Vilander | H01F 17/0006 29/602.1 |
| 2009/0230777 A1* | 9/2009 | Baarman | H01F 38/14 307/104 |
| 2010/0219698 A1 | 9/2010 | Azancot et al. | |
| 2010/0259217 A1 | 10/2010 | Baarman et al. | |
| 2011/0133570 A1 | 6/2011 | Mayo et al. | |
| 2013/0076154 A1* | 3/2013 | Baarman | H01F 38/14 307/104 |
| 2013/0103023 A1* | 4/2013 | Monson | H02J 7/00 606/33 |
| 2013/0119929 A1* | 5/2013 | Partovi | H02J 7/025 320/108 |
| 2013/0123782 A1* | 5/2013 | Trees | H02J 7/00 606/45 |
| 2013/0127405 A1* | 5/2013 | Scherer | H02J 7/025 320/108 |
| 2013/0131660 A1* | 5/2013 | Monson | H02J 7/00 606/33 |
| 2013/0154383 A1 | 6/2013 | Kasturi et al. | |
| 2013/0154553 A1* | 6/2013 | Steele | B60L 11/182 320/108 |
| 2013/0208390 A1* | 8/2013 | Singh | A61N 1/0553 361/139 |
| 2014/0043128 A1* | 2/2014 | Goldbaum | H01F 27/00 336/186 |
| 2014/0217966 A1* | 8/2014 | Schneider | B60L 11/182 320/108 |

FOREIGN PATENT DOCUMENTS

| | | |
|---|---|---|
| WO | 2009081126 A1 | 7/2009 |
| WO | WO-2012127953 A1 | 9/2012 |
| WO | 2012138949 A2 | 10/2012 |

* cited by examiner

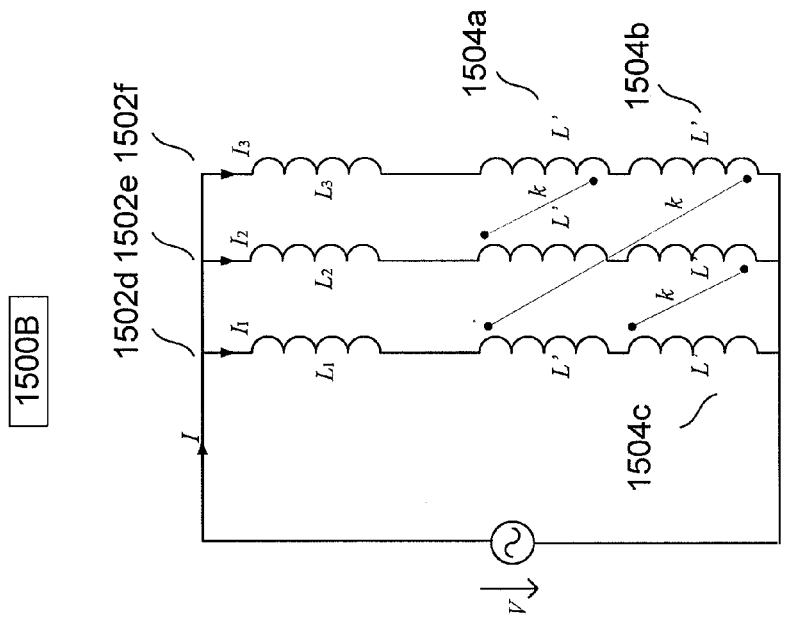
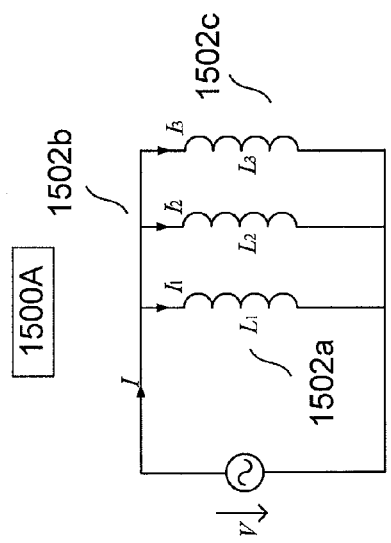
Figure 15

SYSTEM AND METHOD FOR INDUCTANCE COMPENSATION IN WIRELESS POWER TRANSFER

CROSS REFERENCE TO RELATED APPLICATIONS

This application claims priority under 35 U.S.C. §119(e) to U.S. Provisional Patent Application No. 61/716,395 entitled "INDUCTANCE COMPENSATIONS FOR WIRELESS POWER TRANSFER" filed on Oct. 19, 2012 and U.S. Provisional Patent Application No. 61/791,882 entitled "INDUCTANCE COMPENSATIONS FOR WIRELESS POWER TRANSFER" filed on Mar. 15, 2013, which are both hereby incorporated by reference in their entirety.

FIELD

The present disclosure relates generally to wireless power transfer, and more specifically to devices, systems, and methods related to wireless power transfer to remote systems such as vehicles including batteries. More particularly, the present invention relates to inductance compensation techniques to equalize and/or compensate inductance, including self-inductance and mutual inductance between strands, to balance currents in a multi-strand coil of a wireless power transfer transmitter device used in wireless power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

In a multi-strand circular or rectangular coil, for example, a coil used for a base pad of wireless power transfer systems, inductance of strands, including both self-inductance of each strand and mutual inductance between strands, can be slightly different due to their positions in a winding structure. This inductance variation may cause a large current variation between stands in a multi-strand coil due to high mutual inductance between them. In a special case, self-inductance may be equal but mutual inductance between pairs of strands are unequal and causing current variation. A current variation can cause reductions in coupling and/or increased losses and thus reduced power transfer efficiency. To reduce the current variation, inductance of strands needs to be equalized and/or compensated.

SUMMARY

Various implementations of systems, methods and devices within the scope of the appended claims each have several aspects, no single one of which is solely responsible for the desirable attributes described herein. Without limiting the scope of the appended claims, some prominent features are described herein. Note that the relative dimensions of the following figures may not be necessarily drawn to scale.

In one aspect, an apparatus for wirelessly transferring power from a charging power source to a device is provided. The apparatus comprises a first strand wound in one or more turns and operationally coupled to the charging power source and a second strand wound together with the first strand in one or more turns and operationally coupled to the charging power source. The apparatus further comprises an inductor circuit connected to the first strand and disconnected from the second strand. The inductor circuit is further configured to reduce a current difference between a first current flowing through the first strand and a second current flowing through the second strand.

In another aspect, an apparatus for wirelessly transferring power from a charging power source to a device is provided. The apparatus comprises a first strand wound in one or more turns and a second strand wound together with the first strand in one or more turns. Both the first strand and the second strand are operationally coupled to the charging power source. The apparatus further comprises a first transformer connected to the first strand and a second transformer connected to the second strand. The first transformer is disconnected from the second strand and the second transformer is disconnected from the first strand. The first transformer and the second transformer are configured to collectively reduce a current difference between a first current flowing through the first strand and a second current flowing through the second strand.

Another aspect of the disclosure provides a method of wirelessly power transfer from a charging power source to a device. The method comprises transmitting power via a first strand wound in one or more turns and operationally coupled to the charging power source and transmitting power via a second strand wound together with the first strand in one or more turns and operationally coupled to the charging power source. The method further comprises providing power via an inductor circuit connected to the first strand. The inductor circuit is disconnected from the second strand. In addition, the method comprises reducing a current difference between a first current flowing through the first strand and a second current flowing through the second strand.

Another aspect of the disclosure provides a method of wirelessly power transfer from a charging power source to a device. The method comprises transmitting power via a first strand wound in one or more turns and operationally coupled to the charging power source and transmitting power via a second strand wound together with the first strand in one or more turns and operationally coupled to the charging power source. The method further comprises providing power via a first transformer operationally coupled to the first strand and providing power via a second transformer operationally coupled to the second strand. The first transformer is disconnected from the second strand and the second transformer is disconnected from the first strand. In addition, the method comprises reducing a current difference between a first current flowing through the first strand and a second current flowing through the second strand.

Another aspect of an apparatus for wirelessly transferring power from a charging power source to a device is provided. The apparatus comprises first means for transmitting wireless power to the device and second means for transmitting wireless power to the device. The apparatus further comprises means for reducing a current difference between a first current flowing through the first means for transmitting and a second current flowing through the second means for transmitting. The means for reducing is connected to the first means for transmitting and disconnected from the second means for transmitting.

Another aspect of an apparatus for wirelessly transferring power from a charging power source to a device is provided. The apparatus comprises first means for transmitting wireless power to the device and second means for transmitting wireless power to the device. The apparatus further comprises first means for reducing a current difference between a first current flowing through the first means for transmitting and a second current flowing through the second means for transmitting and second means for reducing the current difference. The first means for reducing is connected to the first means for transmitting and disconnected from the second means for transmitting. The second means for reducing is connected to the second means for transmitting and disconnected from the first means for transmitting.

BRIEF DESCRIPTION OF THE DRAWINGS

FIG. 15 is a diagram of exemplary equivalent circuits showing one inductance compensation technique applied to a trifilar coil.

Figure 1:
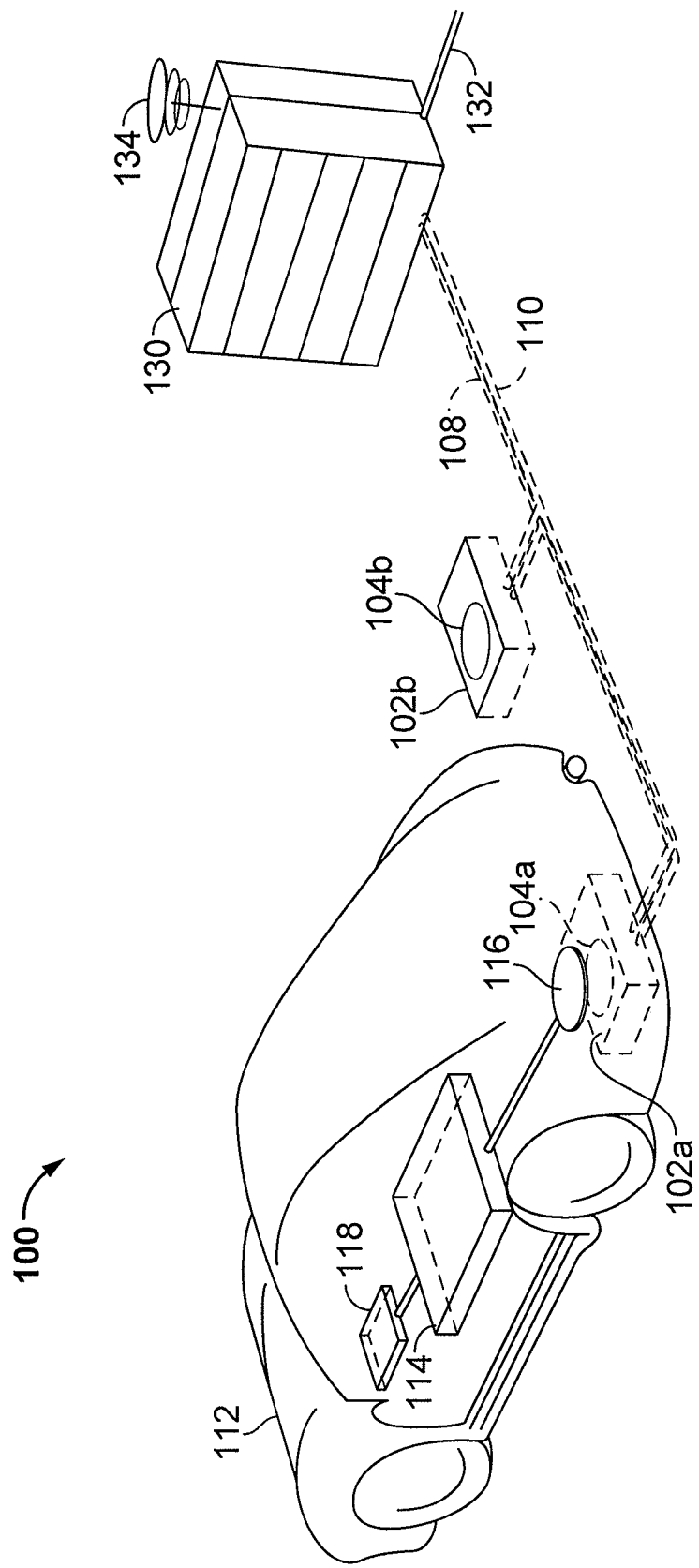
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104*a* for example, via a region of the electromagnetic field generated by the base system induction coil 104*a*.

In some exemplary embodiments, the electric vehicle induction coil 116 may receive power when the electric vehicle induction coil 116 is located in an energy field produced by the base system induction coil 104*a*. The field corresponds to a region where energy output by the base system induction coil 104*a* may be captured by an electric vehicle induction coil 116. For example, the energy output by the base system induction coil 104*a* may be at a level sufficient to charge or power the electric vehicle 112. In some cases, the field may correspond to the "near field" of the base system induction coil 104*a*. The near-field may correspond to a region in which there are strong reactive fields resulting from the currents and charges in the base system induction coil 104*a* that do not radiate power away from the base system induction coil 104*a*. In some cases the near-field may correspond to a region that is within about $\frac{1}{2\pi}$ of wavelength of the base system induction coil 104*a* (and vice versa for the electric vehicle induction coil 116) as will be further described below.

Local distribution 1130 may be configured to communicate with external sources (e.g., a power grid) via a communication backhaul 134, and with the base wireless charging system 102*a* via a communication link 108.

In some embodiments the electric vehicle induction coil 116 may be aligned with the base system induction coil 104*a* and, therefore, disposed within a near-field region simply by the driver positioning the electric vehicle 112 correctly relative to the base system induction coil 104*a*. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104*a*, or a combination thereof may have functionality for displacing and moving the induction coils 116 and 104*a* relative to each other to more accurately orient them and develop more efficient coupling therebetween.

The base wireless charging system 102*a* may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102*a* transfers power to the electric vehicle 112 and the electric vehicle 112 transfers power to the base wireless charging system 102*a* e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
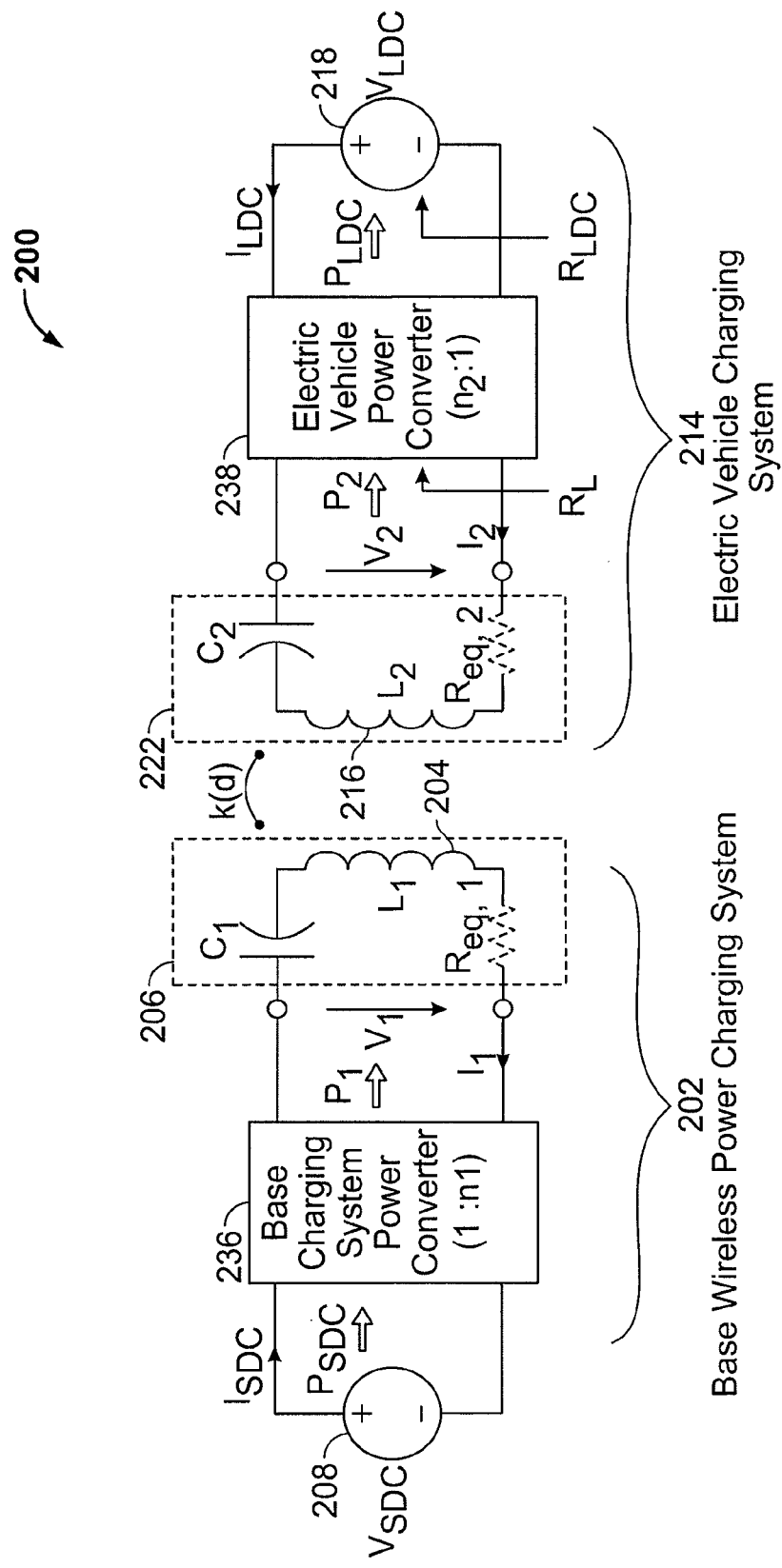
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102*a*.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. The inductance may also include mutual inductance between induction coils. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in substantial parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
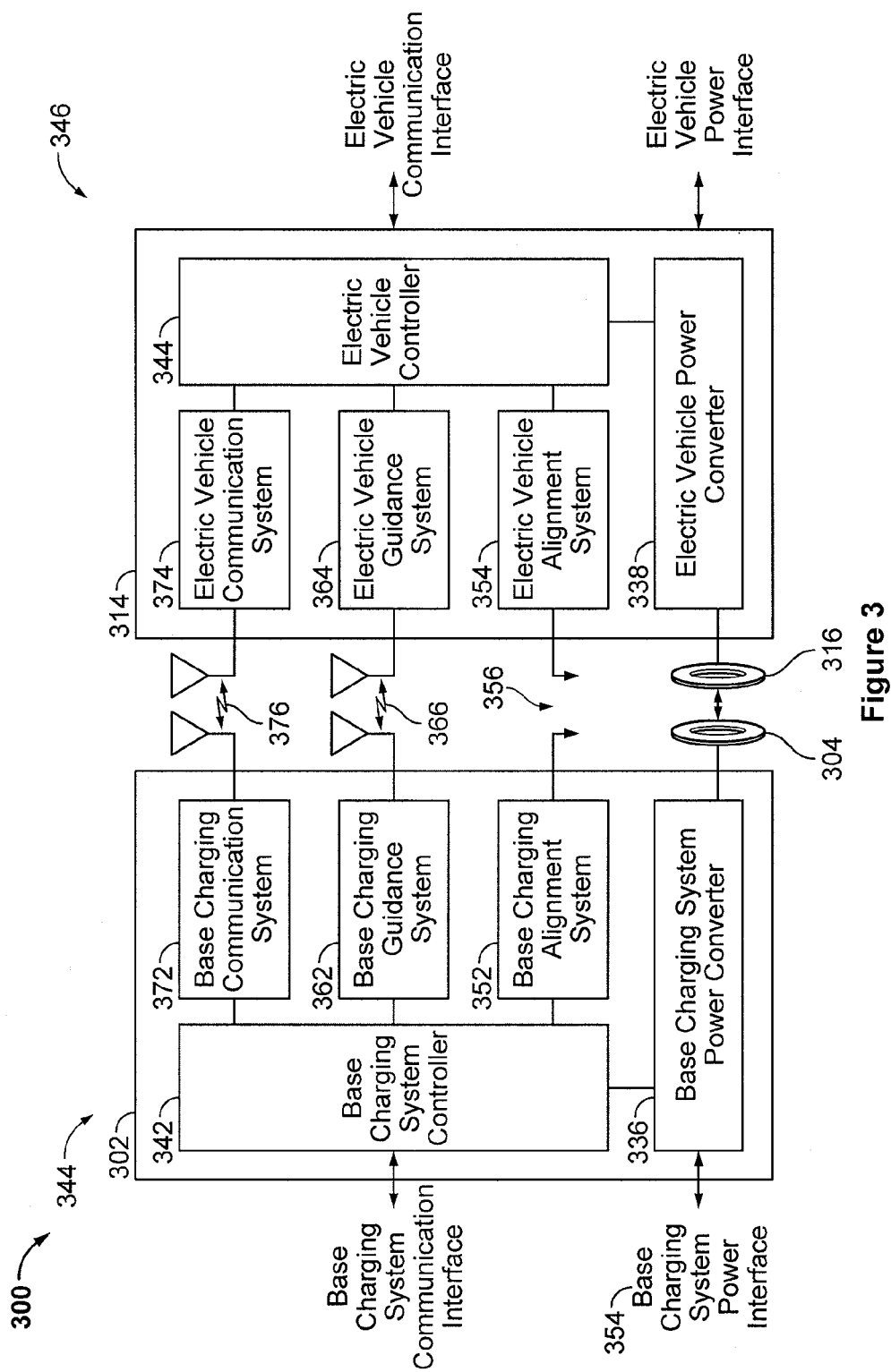
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102*a* and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
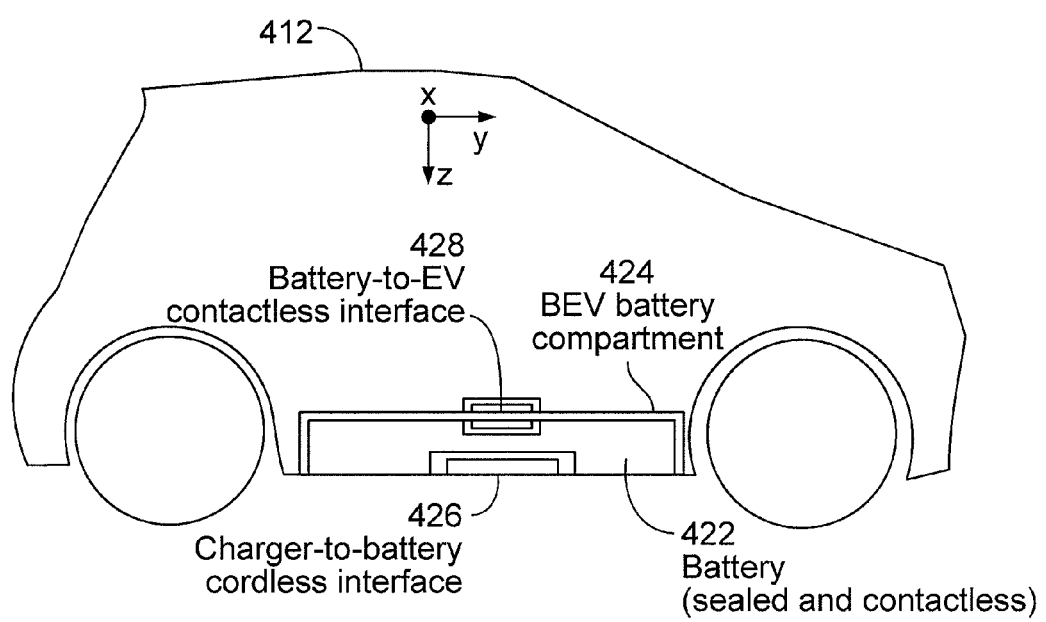
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
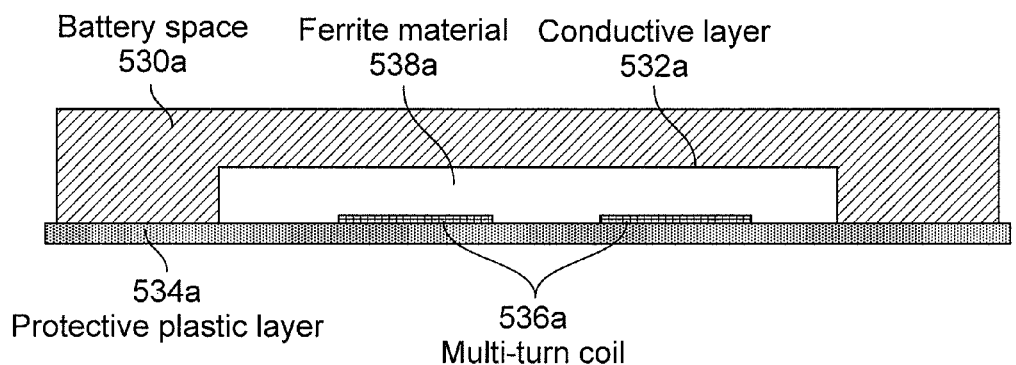
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
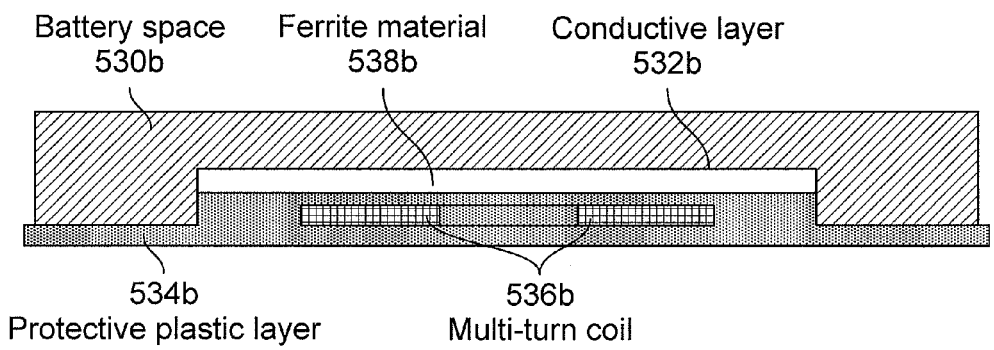

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
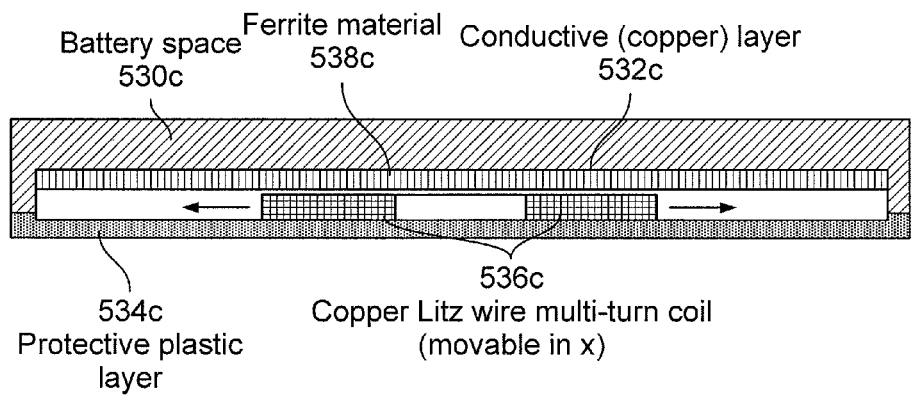
Figure 5D:
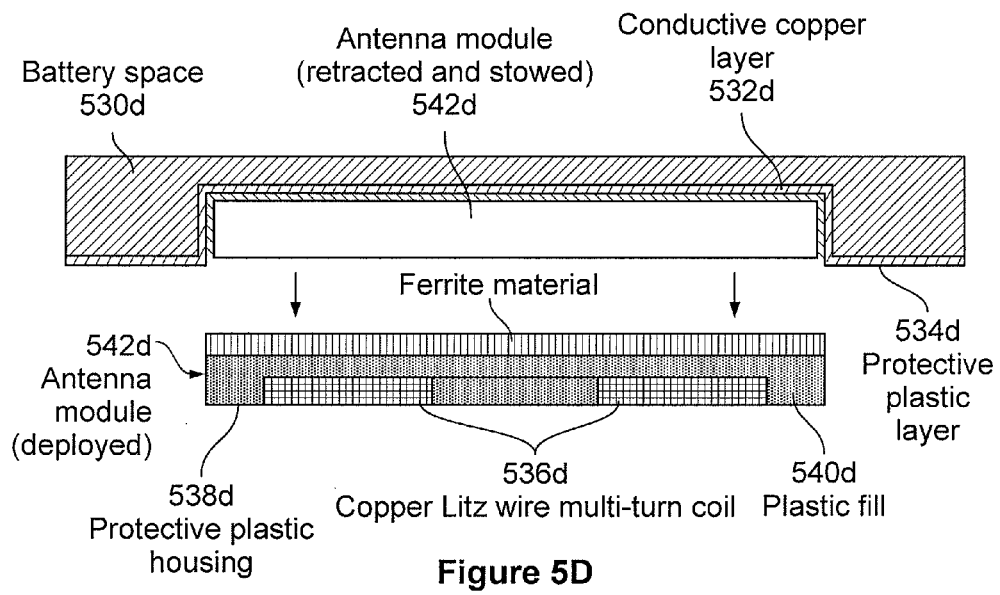

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 5d38 from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
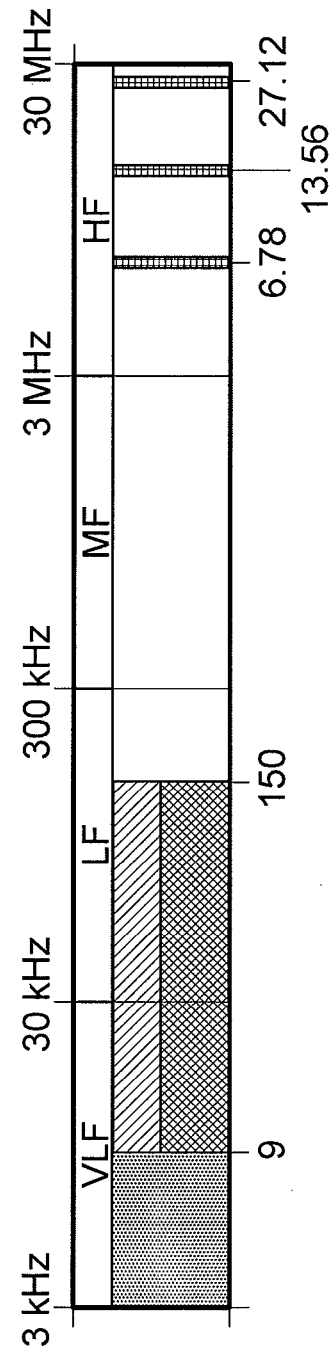
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications), HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
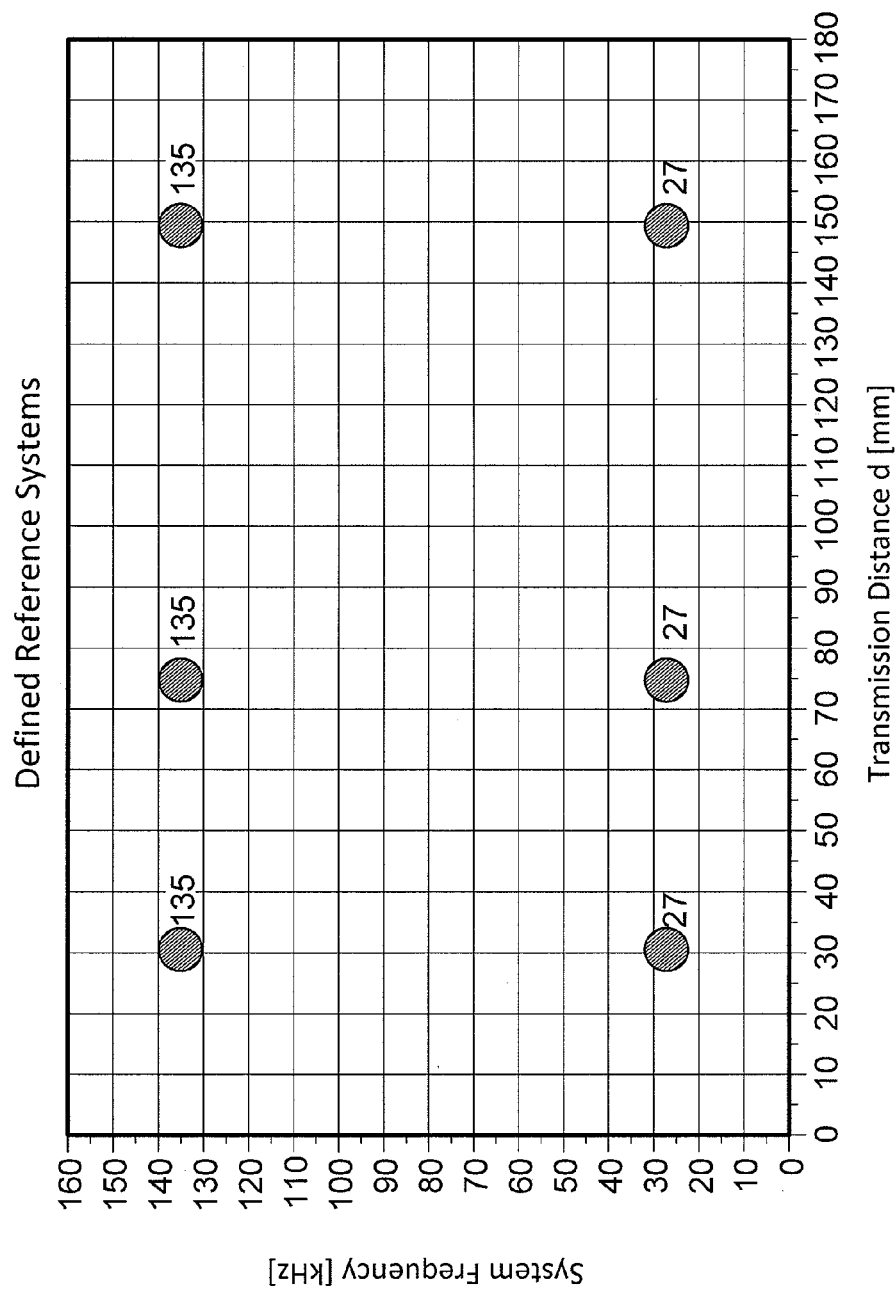
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

The term "coil" as used herein refers to a string-like piece or filament of relatively rigid or flexible material, commonly referred to as cable or wire, being of the type comprising either a single conductive strand or multiple ones of such strands grouped together as one functional conductive path. That is, although it is conventional to physically wind a strand of conductor in the configuration of a spiral, the foregoing terms as used herein refer to the resulting configuration and not the methodology used to form the pattern. So, for example, a coil may be formed from a cylindrical body by removal of body material, this resulting in a shape that corresponds to a spiral winding. The term multi-strand coil refers to such a coil formed as a single identifiable unit and composed of multiple conductive strands which may be twisted, woven, braided or intertwined with one another to form an identifiable single unit of wire. Multi-strand coil may take the form of coil that embodies a circular, a rectangular, or a non-rectangular cross section.

Figure 8:
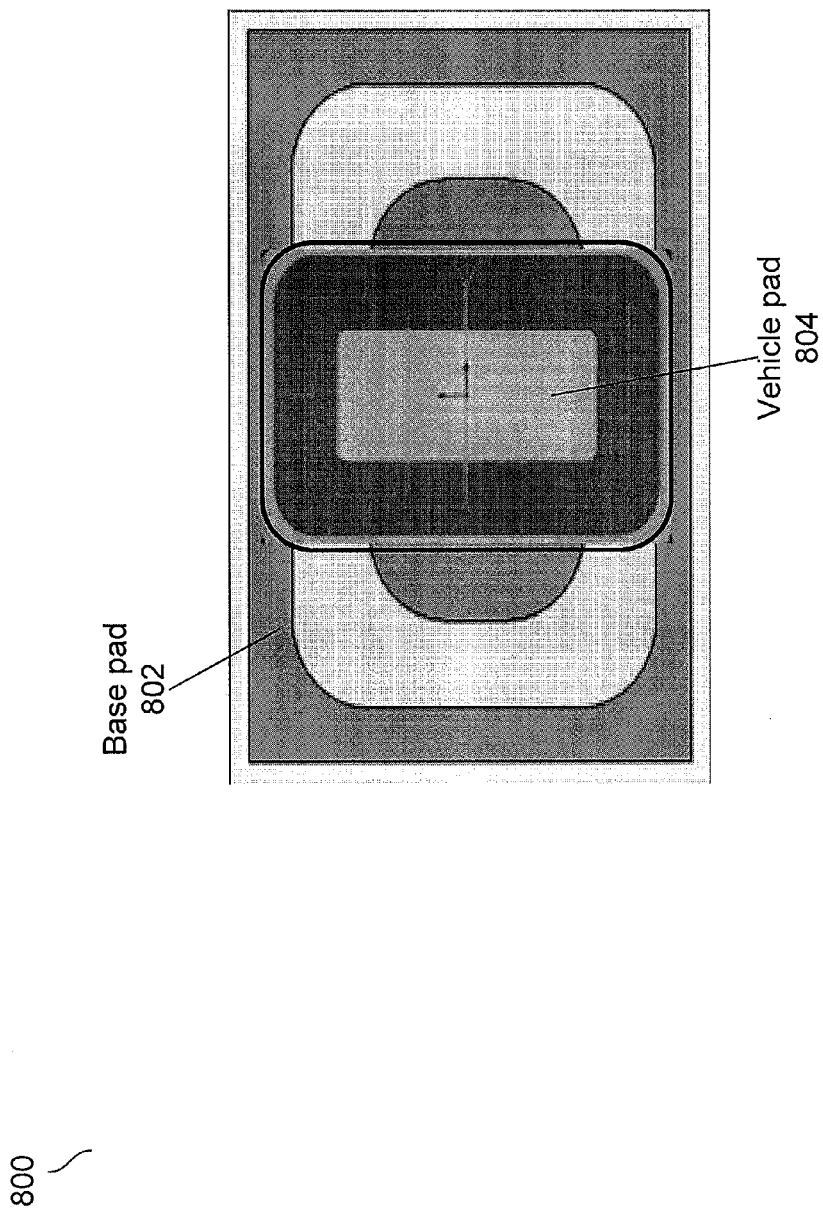
FIG. 8 is a diagram showing an exemplary arrangement between a base pad and a vehicle pad.

FIG. 8 is a diagram showing an exemplary arrangement between a base pad 802 and a vehicle pad 804. The vehicle pad 804 comprises at least one receiver coil that is configured to receive power from at least one coil of the base pad 802. In some embodiments, the vehicle pad 804 may be placed on top of the base pad 802. In some other embodiments, the vehicle pad 804 may be placed on bottom of the base pad 802. In other embodiments, the vehicle pad 804 may be placed next to the base pad 802.

Figure 9:
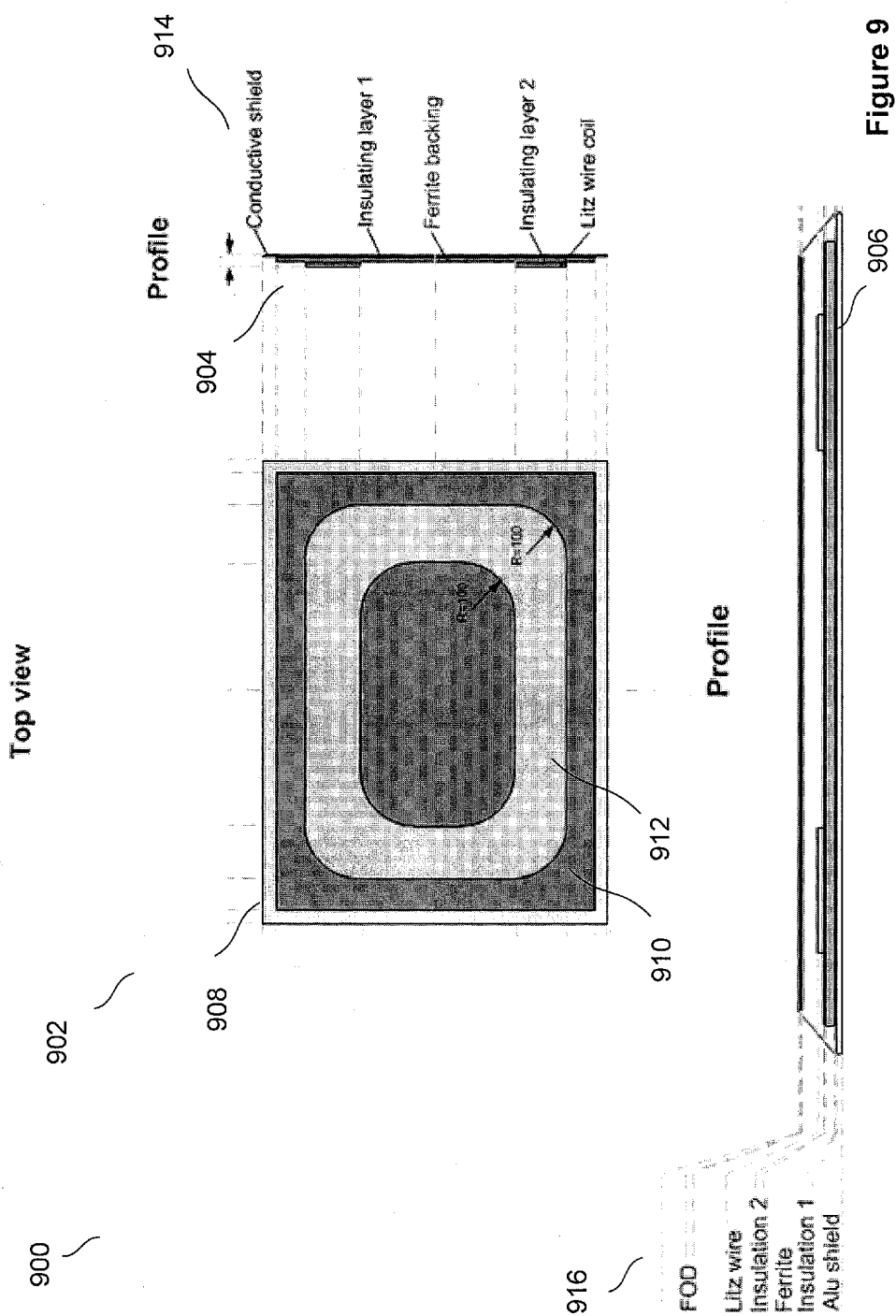
FIG. 9 is a diagram showing several views and profiles of an exemplary base pad.

FIG. 9 is a diagram showing several views and two profiles of an exemplary base pad 802 (see FIG. 8). FIG. 9 shows a top view 902 and two side views 904 and 906. More particularly, the side view 904 shows a profile 914 and the side view 906 shows a profile 916. Corresponding to details shown in FIG. 9, the profile 914 shows that the base pad 802 comprises a conductive shield 908, at least one insulating layer 910, a coil 912 and a Ferrite backing 918. In some embodiments, the insulating layer 910 may have two individual insulting layers, an insulating layer 1 and an insulating layer 2, as shown in FIG. 9.

Figure 10:
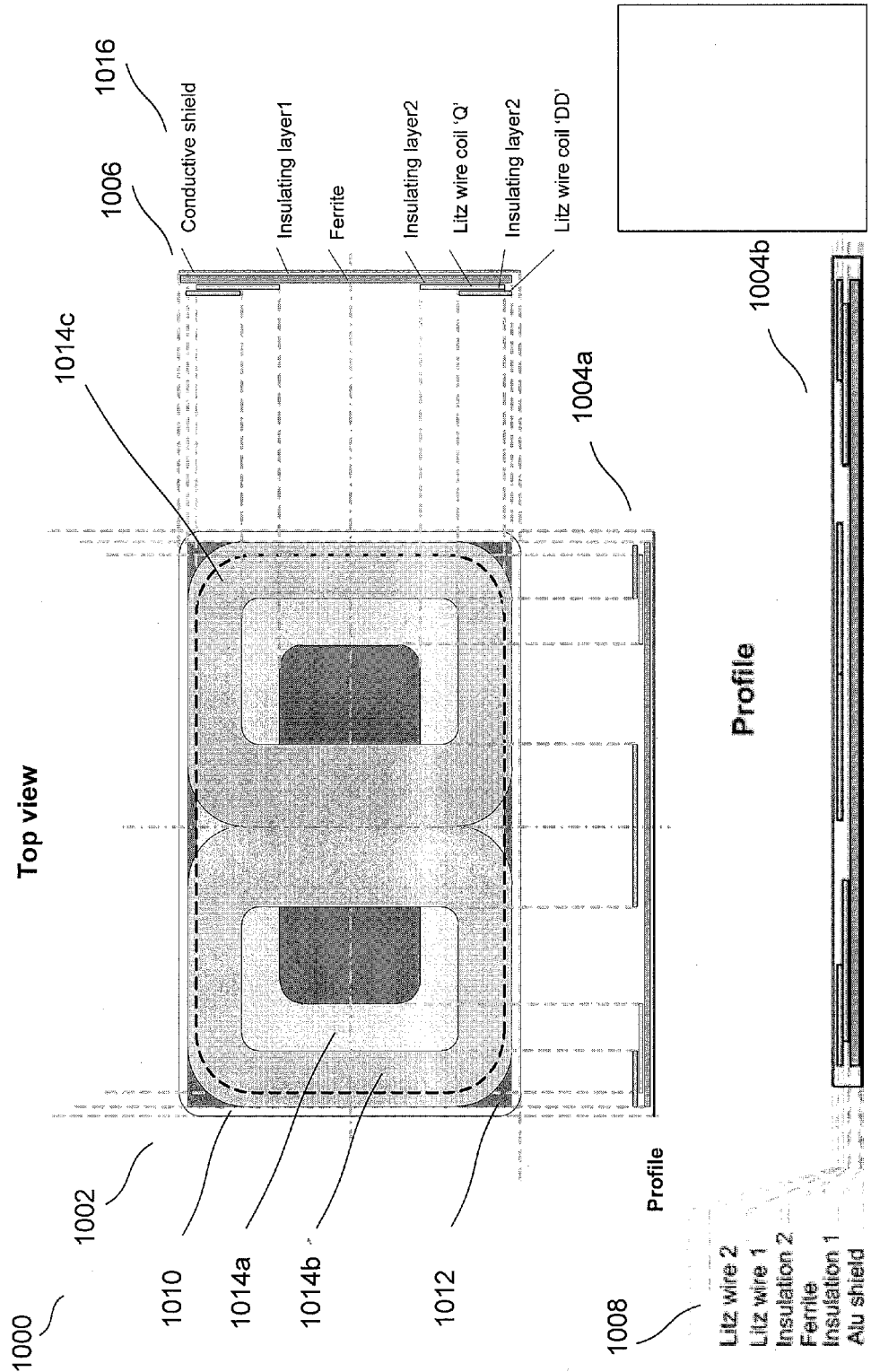
FIG. 10 is a diagram showing several views and profiles of another exemplary base pad.

FIG. 10 is a diagram showing three views and two profiles of an exemplary base pad 802 (see FIG. 8). FIG. 10 shows a top view 1002 and two side views 1004 and 1006. More particularly, the side view 1004 shows a profile 1008 and the side view 1006 shows a profile 1016. Corresponding to details shown in FIG. 10, the profile 1016 of the base pad 802 shows that the base pad 802 comprises a conductive shield 1010, at least one insulating layer 1012 and at least three coils 1014a, 1014b and 1014c. Two coils 1014b and 1014c are next to each other on a plane. They are placed on top of the coil 1014a. In some embodiments, the insulating layer 1012 may have two individual insulating layers, an insulating layer 1 and an insulating layer 2, as shown in FIG. 10.

Figure 11:
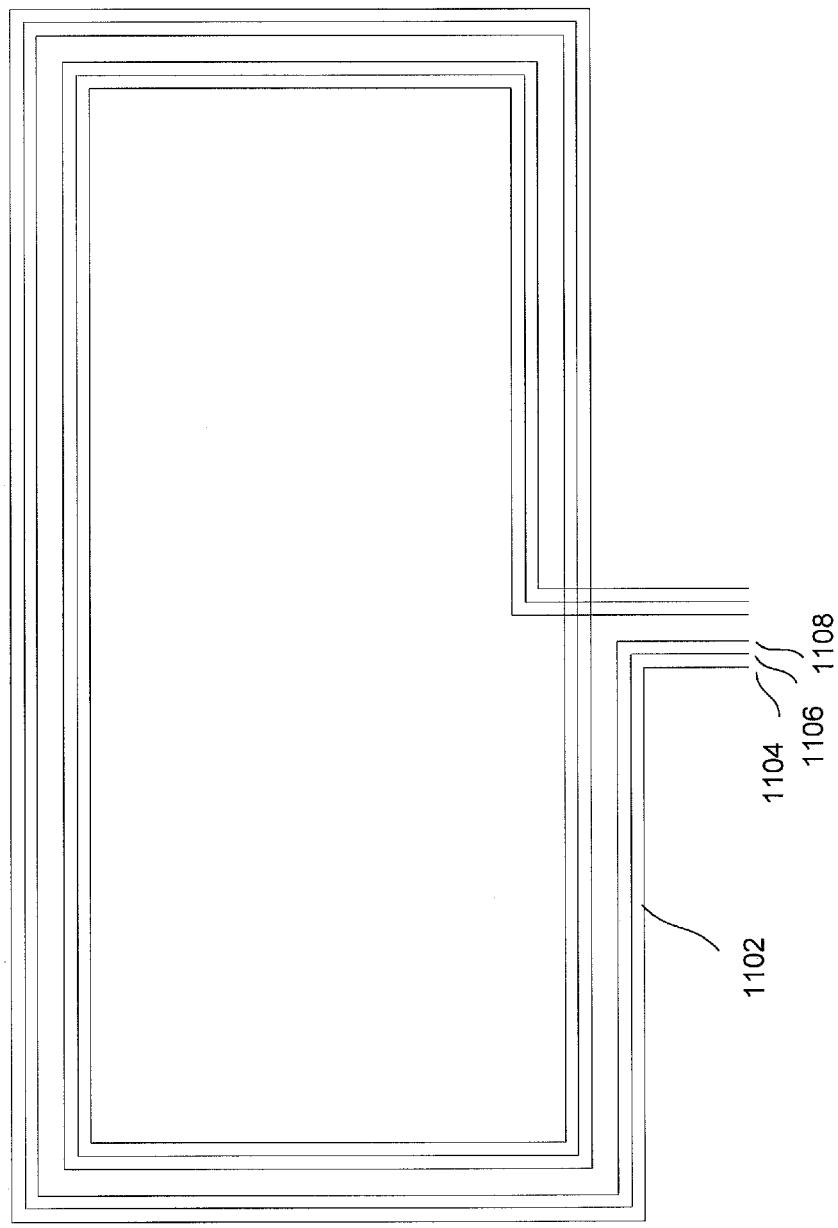
FIG. 11 is a diagram showing an exemplary winding arrangement for a multifilar coil.

FIG. 11 is a diagram showing an exemplary winding arrangement 1102 for a multifilar coil, such as a coil 912 (see FIG. 9), a coil 1014a, a coil 1014b or a coil 1014c (see FIG. 10). In the diagram of FIG. 11, the winding arrangement 1102 comprises at least three windings 1104, 1106 and 1108 that are arranged in substantial parallel with each other. In one embodiment, they have an equal number of turns since they are multifilar or trifilar wound from one end to the other.

Figure 12:
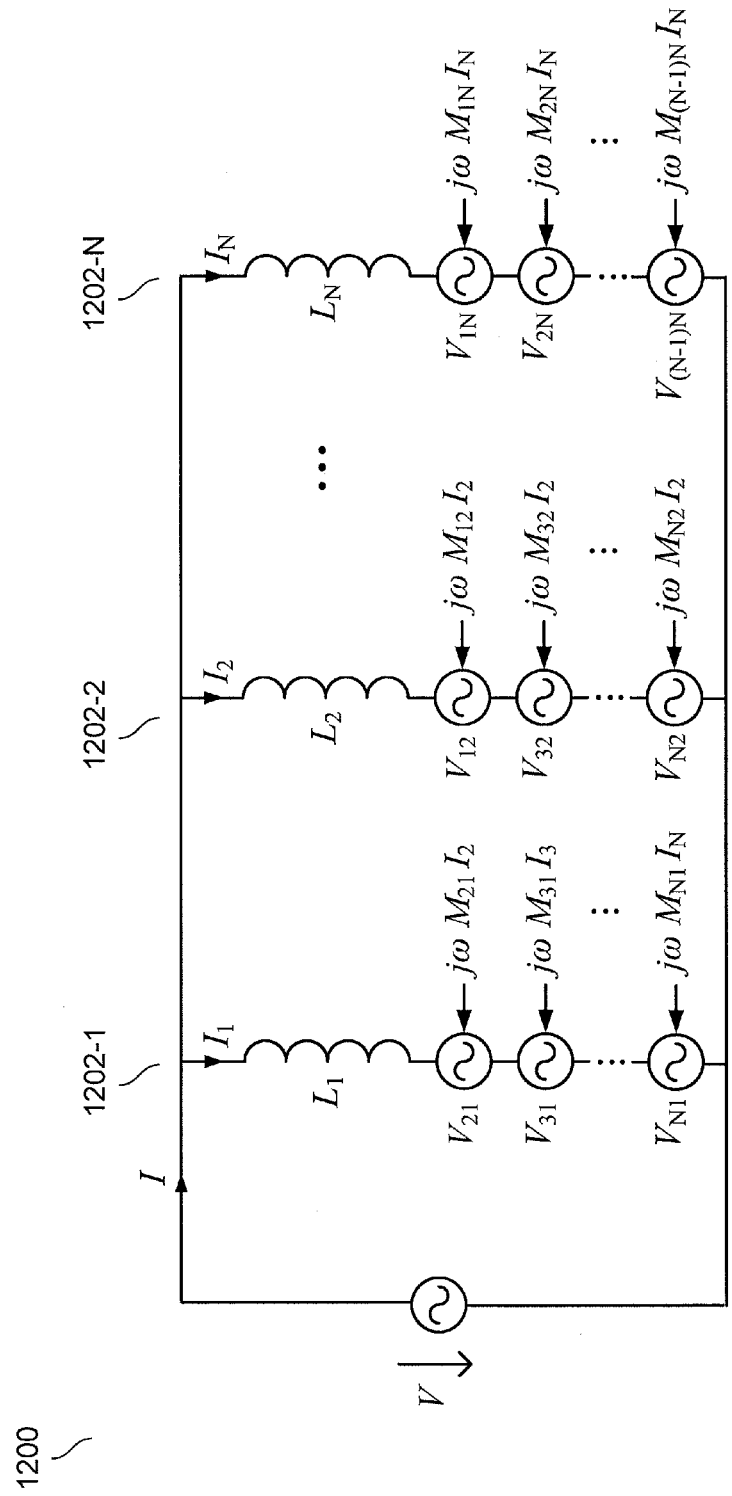
FIG. 12 is a diagram of an exemplary equivalent circuitry representation of a multifilar coil.

FIG. 12 is a diagram of an exemplary equivalent circuitry representation 1200 of a multifilar coil 1102 (see FIG. 11) in accordance with some exemplary embodiments. As shown in FIG. 12, because an exemplary implementation of the multifilar coil 1102 comprising N windings, the circuit 1200 includes N inductors 1202-1, 1202-2, . . . , and 1202-N, which are connected in substantial parallel with each other and share a same voltage source 1204. When the voltage source 1204 generates a voltage V on the circuit 1200, a current I flows through it. Because there is a mutual inductance between every pair of the N windings of the multifilar coil 1102, there is a mutual inductance between every pair of the N inductors 1202-1, 1202-2, . . . , and 1202-N. For example, on the inductor 1202-1, there are additional (N−1) voltages, $V_{21}$, $V_{31}$, . . . , and $N_{N1}$, respectively induced by the other (N−1) inductors 1202-2, 1202-3, . . . and 1202-N. The same to each of the other (N−1) inductors 1202-2, 1202-3, . . . and 1202-N.

For explaining effects of inductance imbalance, one exemplary equivalent circuit of a bifilar coil is used as an example herein. Similar to a multifilar-equivalent circuit 1200 shown in FIG. 12, in this example a bifilar-equivalent circuit comprises only two inductors in substantial parallel with each other, e.g., the inductor 1202-1 and 1202-2. Although we only provide an example of two inductors, it can also be applied to a circuitry representation of any number of inductors. The bifilar-equivalent circuit further comprises a voltage source, e.g., the voltage source 1204, simultaneously imposing a voltage V on the two inductors, e.g., the inductors 1202-1 and 1202-2. As a result, two currents $I_1$ and $I_2$ are generated to respectively flow through these two inductors. These two currents have two values, which can be written by $$I_1 = \frac{M - L_2}{M^2 - L_1 L_2} \cdot \frac{V}{j\omega} \tag{1}$$

and $$I_2 = \frac{M - L}{M^2 - L_1 L_2} \cdot \frac{V}{j\omega} \tag{2}$$

where Inductances $L_1$ and $L_2$ respectively denotes inductance of the two inductors. A mutual inductance between these two inductors is denoted by M. A relationship between the mutual inductance M and the inductances $L_1$ and $L_2$ is $$M = k\sqrt{L_1 L_2} \tag{3}$$

where the variable k denotes a couple factor between the two inductors.

For quantifying an inductance imbalance between the two inductors, an inductance ratio between the two inductors may be defined and written by $$\frac{L_1}{L_2} = 1 + \Delta \tag{4}$$

where $\Delta$ denotes a percentage of inductance imparity between the two inductors. If the mutual inductance M is considered, an inductance ratio between the two inductor may be defined and written by $$\frac{L_1 + M}{L_2 + M} = 1 + \Delta \tag{5}$$

In some embodiments, $\Delta$ typically has a value between 0 and 100%. In one implementation, a method to reduce $\Delta$ is to increase a value of M.

Accordingly, a current ratio between the currents $I_1$ and $I_2$ is derived as $$\frac{I_1}{I_2} = \frac{L_2}{L_1} \frac{1 - k\sqrt{\frac{L_1}{L_2}}}{1 - k\sqrt{\frac{L_2}{L_1}}} = \tag{6}$$

$$\frac{1}{1+\Delta} \cdot \frac{1 - k\sqrt{1+\Delta}}{1 - k\sqrt{\frac{1}{1+\Delta}}} \cong \frac{1}{1+\Delta} \cdot \frac{1 - k\left(1 + \frac{\Delta}{2}\right)}{1 - k\left(1 - \frac{\Delta}{2}\right)} \cong \frac{1}{1+\Delta} \cdot \frac{1 - k - \frac{\Delta}{2}}{1 - k + \frac{\Delta}{2}}$$

In addition, a leakage factor s is defined as s=1−k. As such, the current ratio expressed by Equation (6) can be written by $$\frac{I_1}{I_2} \cong \frac{1}{1+\Delta} \cdot \frac{1 - \frac{\Delta}{2(1-k)}}{1 + \frac{\Delta}{2(1-k)}} \cong 1 - \frac{\Delta}{s} \tag{7}$$

In some embodiments, the percentage of inductance imparity is $\Delta$=2% and the leakage factor s=0.04. As a result, the current ratio between the two currents $I_1$ and $I_2$ can be approximated by $$\frac{I_1}{I_2} \cong 0.5 \tag{8}$$

This means there may be a significant current imbalance (e.g., ~50%) between the currents flowing through the two inductors, even though the percentage of inductance imparity $\Delta$ is only 2% in this example.

In addition, an imbalanced current to balanced current loss ratio may be defined and expressed as $$\frac{P_{imb}}{P_{bal}} = \frac{2(I_1^2 + I_2^2)}{(I_1 + I_2)^2} \cong \frac{\left(2 + \frac{\Delta}{s}\right)^2 + \left(\frac{\Delta}{s}\right)^2}{\left(2 + \frac{\Delta}{s}\right)^2} = 1 + \frac{\Delta^2}{(2s + \Delta)^2} \tag{9}$$

As a result, in the example of the percentage of imparity $\Delta$=2% and the leakage factor s=0.04, this imbalance current to balance current loss ratio becomes $$\frac{P_{imb}}{P_{bal}} \cong 1.04 \qquad (10)$$

Figure 13:
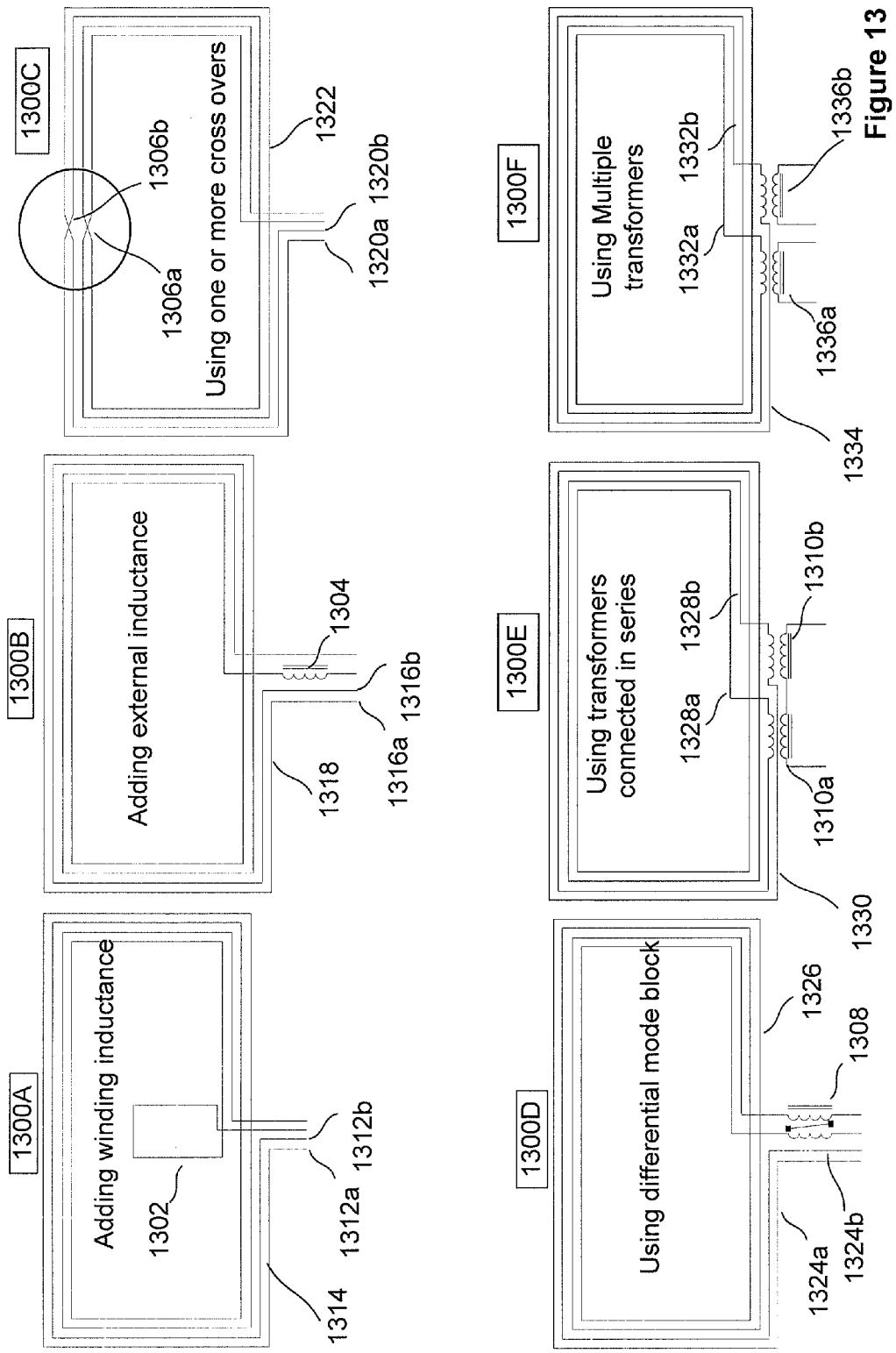
FIG. 13 is a diagram of various exemplary parallel winding arrangements of a multifilar coil.

FIG. 13 is a diagram showing six exemplary inductance compensation techniques 1300A, 1300B, 1300C, 1300D, 1300E, and 1300F for a multifilar coil 1102 in accordance with some exemplary embodiments. These six inductance compensation techniques can be used to equalize and/or compensate inductance of the multifilar coil 1102 and therefore reduce current variations that the multifilar coil 1102 may have during power transfer. Although we only provide exemplary implementations of a bifilar coil with two strands and, every exemplary implementation shown in FIG. 13 can also be applied to a multifilar coil with N strands.

As shown in FIG. 13, in one exemplary implementation of the inductance compensation technique 1300A, a loop wire 1302 is added to a bifilar coil 1314. The bifilar coil 1314 comprises two strands 1312a and 1312b. The loop wire 1302 is added into the strand 1312b of the bifilar coil 1312. The loop wire 1302 may be further disconnected from the strand 1312a. In one exemplary implementation, a first end of the loop wire 1302 is connected to a first end of the strand 1312b. A second end of the loop wire 1302 may be further connected to a second end of the strand 1312b. Adding the loop wire 1302 essentially adds winding inductance that affects the overall inductance in the strand of the bifilar coil 1314. However, the added winding inductance changes not only the inductance of the strand but also mutual inductance between this strand and each of the other strands of the bifilar coil 1314. As a result, the loop wire 1302 can be selected with inductance to balance currents flowing through the strands 1312a and 1312b of the bifilar coil 1314.

As shown in FIG. 13, in one exemplary implementation of the inductance compensation technique 1300B, an inductor circuit 1304 is added to a bifilar coil 1318. In one exemplary implementation, the inductor circuit 1304 is an external inductor, an internal inductor or a combination of these two. The bifilar coil 1318 comprises two strands 1316a and 1316b. The inductor circuit 1304 is added to the strand 1316b. The inductor circuit 1304 may be further disconnected from the strand 1316a. In another exemplary implementation, a first end of the inductor circuit 1304 is connected to a first end of the strand 1316b. A second end of the loop 1304 may be further connected to a second end of the strand 1316b. Similar to the inductance compensation technique 1300A, the inductor circuit 1304 changes the inductance of the strand 1316b. However, the inductor circuit 1304 may not change mutual inductance between the strands 1316a and 1316b of the bifilar 1318. Nevertheless, with properly configuring a value of the inductor circuit 1304, the inductance compensation technique 1300B balances currents flowing through the strands 1316a and 1316b of the bifilar coil 1318 and improves a power transfer efficiency of the bifilar coil 1318.

As shown in FIG. 13, in one exemplary implementation of the inductance compensation technique 1300C, two cross overs 1306a and 1306b are added to a bifilar coil 1322. The bifilar 1322 comprises two strands 1320a and 1320b. The use of the cross overs on the strands 1320a and 1320b of the bifilar coil 1322 balances cross areas of the strands' windings. As a result, inductance imbalance of the strands 1320a and 1320b of the bifilar coil 1322 and thus resulting current imbalance is reduced. Therefore, losses are reduced and a power transfer efficiency with the bifilar coil 1322 is improved.

As shown in FIG. 13, in one exemplary implementation of the inductance compensation technique 1300D, one differential mode block 1308 is added on two strands 1324a and 1324b of a bifilar coil 1326. The differential mode block 1308 essentially introduces a negative feedback on currents flowing through the strands 1324a and 1324b of the bifilar coil 1326. This negative feedback reduces the effect of inductance imbalance at least between the strands 1324a and 1324b and therefore it improves a power transfer efficiency of the bifilar coil 1326.

As shown in FIG. 13, in one exemplary implementation of the inductance compensation technique 1300E, two transformers 1310a and 1310b connected in series are respectively applied to two strands 1328a and 1328b of a bifilar coil 1330. The transformer 1310a may be connected to the strand 1328a and disconnected from the strand 1328b. The transformer 1310b may be connected to the strand 1328b and disconnected from the strand 1328a. In one exemplary implementation, a first end of the transformer 1310a is connected to a first end of the strand 1328a. A second end of the loop 1310a may be further connected to a second end of the strand 1328a. In another exemplary implementation, a first end of the transformer 1310b is further connected to a first end of the strand 1328b and a second end of the loop 1310b may be further connected to a second end of the strand 1328b. The transformers 1310a and 1310b may have a transformation ratio. At least one of the transformers 1310a or 1310b may have a transformation ratio that is greater than 1. Similar to the inductance compensation technique 1300D, the use of the transformers 1310a and 1310b is an inductance compensation technique which adjusts currents on the strands 1328a and 1328b for reducing effects of inductance imbalance of a bifilar coil 1330. In some embodiments, with properly selecting the transformers 1310a and 1310b, currents flowing through the strands 1328a and 1328b are same. As a result, a power transfer efficiency of the bifilar coil 1330 can be increased.

As shown in FIG. 13, in one exemplary implementation of the inductance compensation technique 1300F, two transformers 1336a and 1336b are respectively applied to two strands 1332a and 1332b of a bifilar coil 1330. The transformer 1336a may be connected to the strand 1332a and disconnected from the strand 1332b. The transformer 1336b may be connected to the strand 1332b and disconnected from the strand 1332a. In one exemplary implementation, a first end of the transformer 1336a is connected to a first end of the strand 1332a. A second end of the loop 1336a may be further connected to a second end of the strand 1332a. In another exemplary implementation, a first end of the transformer 1336b is further connected to a first end of the strand 1332b and a second end of the loop 1336b may be further connected to a second end of the strand 1332b. The transformers 1336a and 1336b each may have a transformation ratio. At least one of the transformers 1310a or 1310b may have a transformation ratio that is greater than 1. In contrast to FIG. 1300E, the two transformers 1336a and 1336b are driven by two separate voltage sources that are not shown in FIG. 13. In some other embodiments, current imbalance of the bifilar coil 1334 can be compensated by regulating the voltage sources accordingly. The operations on these two transformers 1336a and 1336b may be correlated in some embodiments. The operations on these two transformers 1336a and 1336b may be uncorrelated in some other embodiments. Similar to the inductance compensation technique 1300E, the use of the transformers 1336a and 1336b is an inductance compensation technique which adjusts currents on the strands 1332a and 1332b for reducing effects of inductance imbalance of a bifilar coil 1334. In some embodiments, with properly selecting the transformers 1336a and 1336b, currents flowing through the strands 1332*a* and 1332*b* are same, resulting in minimum losses if strand have equal cross-sections. As a result, a power transfer efficiency of the bifilar coil 1334 can be increased.

Figure 14:
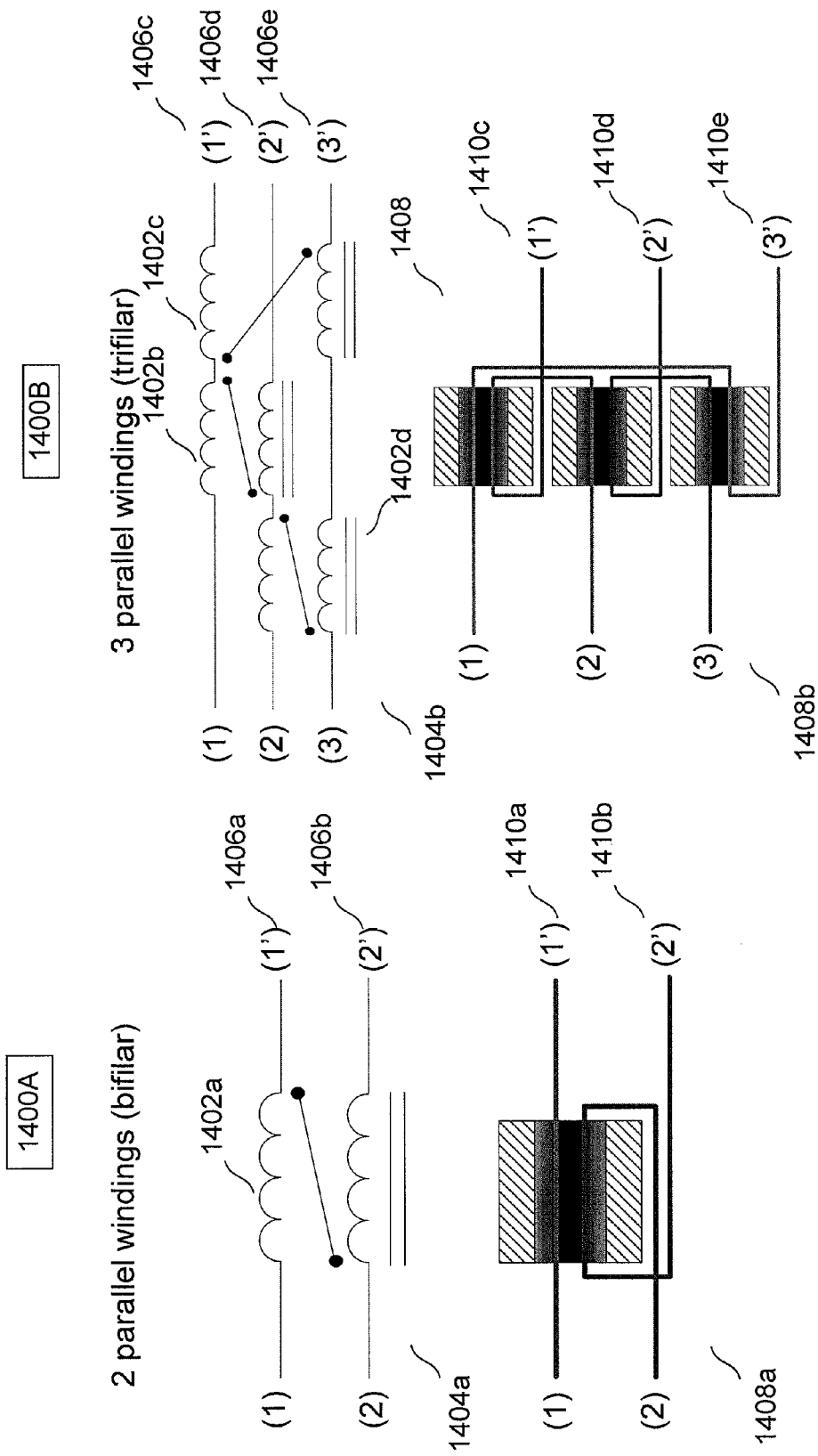
FIG. 14 is a diagram showing certain exemplary implementations of winding arrangements of a multifilar coil.

FIG. 14 is a diagram showing certain exemplary implementations 1400A and 1400B of the inductance compensation technique 1300D (see FIG. 13) in accordance with some embodiments. The implementation 1400A helps to reduce inductance imbalance of a bifilar coil and the implementation 1400B works on a trifilar coil.

As shown in FIG. 14, in some embodiments with the implementation 1400A, a differential mode block 1402*a* is introduced on a bifilar coil 1404*a*. The differential mode block 1402*a* adds a negative feedback between two strands 1406*a* and 1406*b*. For example, when a current flowing through the strand 1406*a* increases, this current increasing inductively reduces a current flowing through the strand 1406*b* because of a negative coupling between the strands 1406*a* and 1406*b*. Sequentially, a reduction on the current flowing through the strand 1406*b* increases the current flowing through the strand 1406*a*. As a result, current imbalance between these two strands is reduced and a power transfer efficiency of this bifilar coil 1404*a* is increased. Another exemplary implementation of the differential mode block 1402 on a bifilar coil 1408*a* is also shown in FIG. 14. In this implementation, a strand 1410*a* is wound in a different direction of a strand 1410*b*. In one embodiment, the strand 1410*a* is wound or wrapped in one or more turns over the strand 1410*b* to introduce a negative feedback between these two strands 1410*a* and 1410*b*.

As shown in FIG. 14, in some other embodiments with an exemplary implementation 1400B, three differential mode blocks 1402*b*, 1402*c* and 1402*d* are used on a trifilar coil 1404*b*. The differential mode blocks 1402*b*, 1402*c* and 1402*d* add a negative feedback between every two of three strands 1406*c*, 1406*d* and 1406*e*. As a result, current imbalance of the trifilar coil 1404*b* is reduced and a power transfer efficiency of this bifilar coil 1404*b* increases. Another exemplary implementation of the differential mode blocks 1402*b*, 1402*c* and 1402*d* on a trifilar coil 1408*b* is also shown in FIG. 14. In this implementation, strands 1410*c*, 1410*d* and 1410*e* are wound in different directions so that there are a negative inductive feedback existing between each pair of the three strands 1410*c*, 1410*d* and 1410*e*. As a result, current imbalance of the trifilar coil 1408*b* is reduced too.

FIG. 15 is a diagram of exemplary equivalent circuits 1500A and 1500B showing one inductance compensation technique 1400B applied to a trifilar coil 1404*b* or 1408*b*. The circuit 1500A represents the trifilar coil 1404*b* before applying the inductance compensation technique 1400B. In the circuit 1500A, there are three inductors 1502*a*, 1502*b* and 1502*c* respectively representing three strands of the trifilar coil 1404*b*. The circuit 1500B represents the trifilar coil 1404*b* after applying the inductance compensation technique 1400B. In the circuit 1500B, besides three inductors 1502*d*, 1502*e* and 1502*f* respectively representing three strands of the trifilar coil 1404*b*, there are three inductance modification blocks 1504*a*, 1504*b* and 1504*c*. These three inductance modification blocks represents an application of the inductance compensation technique 1400B for reducing inductance imbalance of the trifilar coil 1404*b*.

Figure 16:
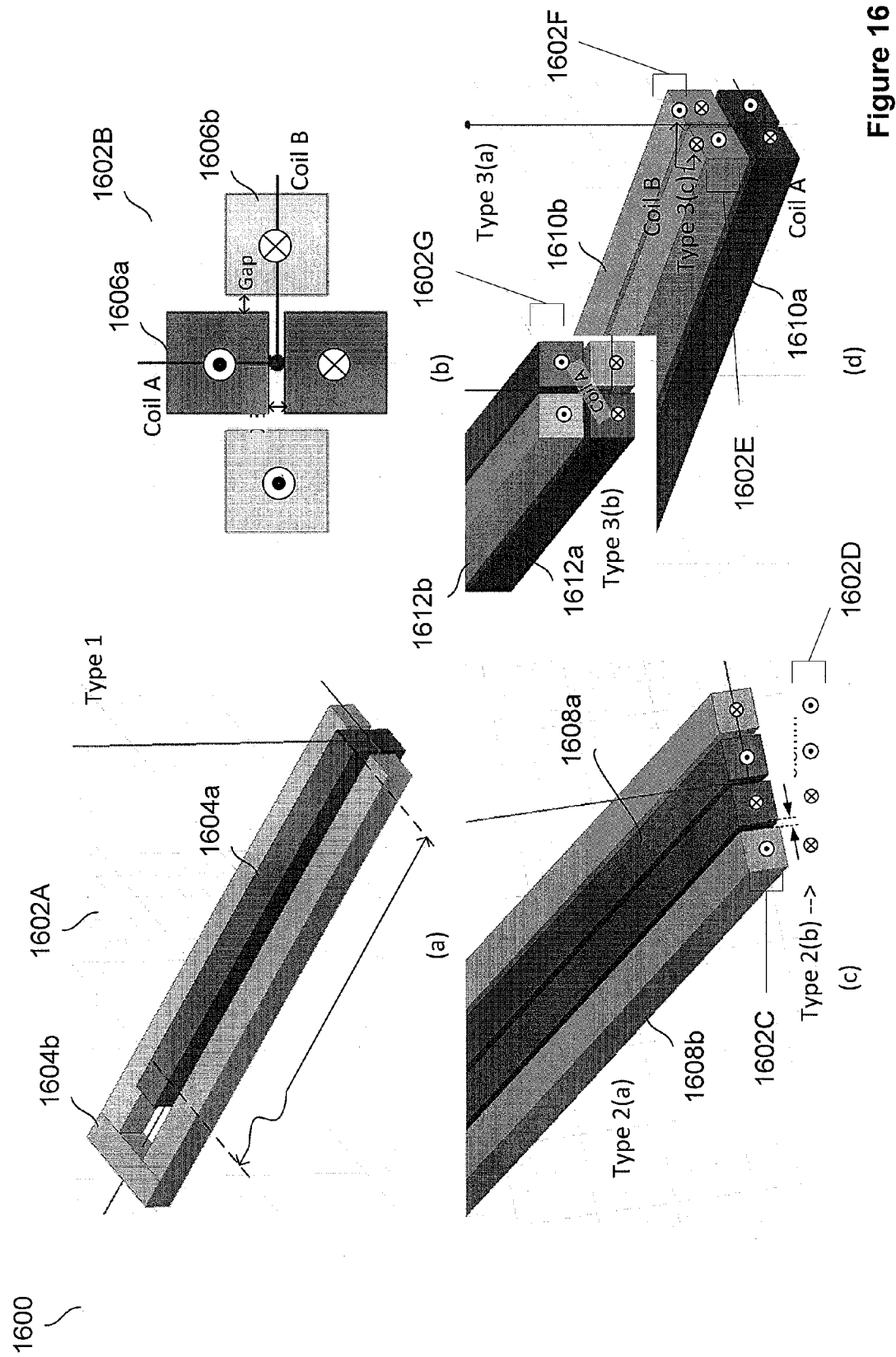
FIG. 16 is a diagram of four lead inductance compensation techniques applied to a bifilar coil.

FIG. 16 is a diagram of four different exemplary implementation of an inductance compensation technique 1400A applied to a bifilar coil 1404*a* or 1408*a* (see FIG. 14). There are several different types of implementations of the inductance compensation technique 1400A: one Type 1 implementation 1602A, two Type 2 implementations 1602C and 1602D, and three Type 3 implementations 1602E, 1602F and 1602G shown in FIG. 16.

In the Type 1 implementation 1602A, a perspective view shows that strands 1604*a* and 1604*b* wound so that the strands' respective axis lines fall in two geometric planes that are perpendicular to each other. A cross section perspective view of the Type 1 implementation 1602A is shown as a Type 1 implementation 1602B. As show in FIG. 16, there are a gap between a strand 1606*a* and a strand 1606*b*. With controlling the size of the gap, inductance imbalance between Coil A and Coil B may be adjusted.

In the Type 2 implementation 1602C, a perspective view shows that a strand 1608*b* is wound around an outside of a strand 1608*a*. Both the strands 1608*a* and 1608*b* are wound so that the strands' respective axis lines fall in a common plane. However, two currents respectively flowing through the two strands 1608*a* and 1608*b* have two different directions. In the Type 2 implementation 1602D, the two strands 1608*a* and 1608*b* are wound on the same plane and have two currents flowing through in a same direction. Similar to the Type 1 implementation 1602A, there is a gap between the two strands 1608*a* and 1608*b*. With properly adjusting the size of the gap, inductance imbalance between the two strands 1608*a* and 1608*b* may be controlled.

In the two Type 3 implementations 1602E and 1602F, a strand 1610*a* is wound in parallel with and on top of a strand 1610*b*. In the Type 3 implementation 1602E, the strands 1610*a* and 1610*b* have two currents respectively flowing in two different directions through two strands 1610*a* and 1610*b*. However, in the Type 3 implementation 1602F, the strands 1610*a* and 1610*b* have two currents flowing in a same direction through the two strands 1610*a* and 1610*b*. In the Type 3 implementation 1602G, strands 1612*a* and 1612*b* are respectively wound so that the strands' respective axis lines fall in two planes that are perpendicular to each other.

As described above, the different arrangements may result in different ratios between the two currents in the two strands. For example, for a Type 3 arrangement, the variation in coil inductance may result in a ratio between the two currents that is lower than the ratio between the two currents of a Type 1 arrangement.

Figure 17:
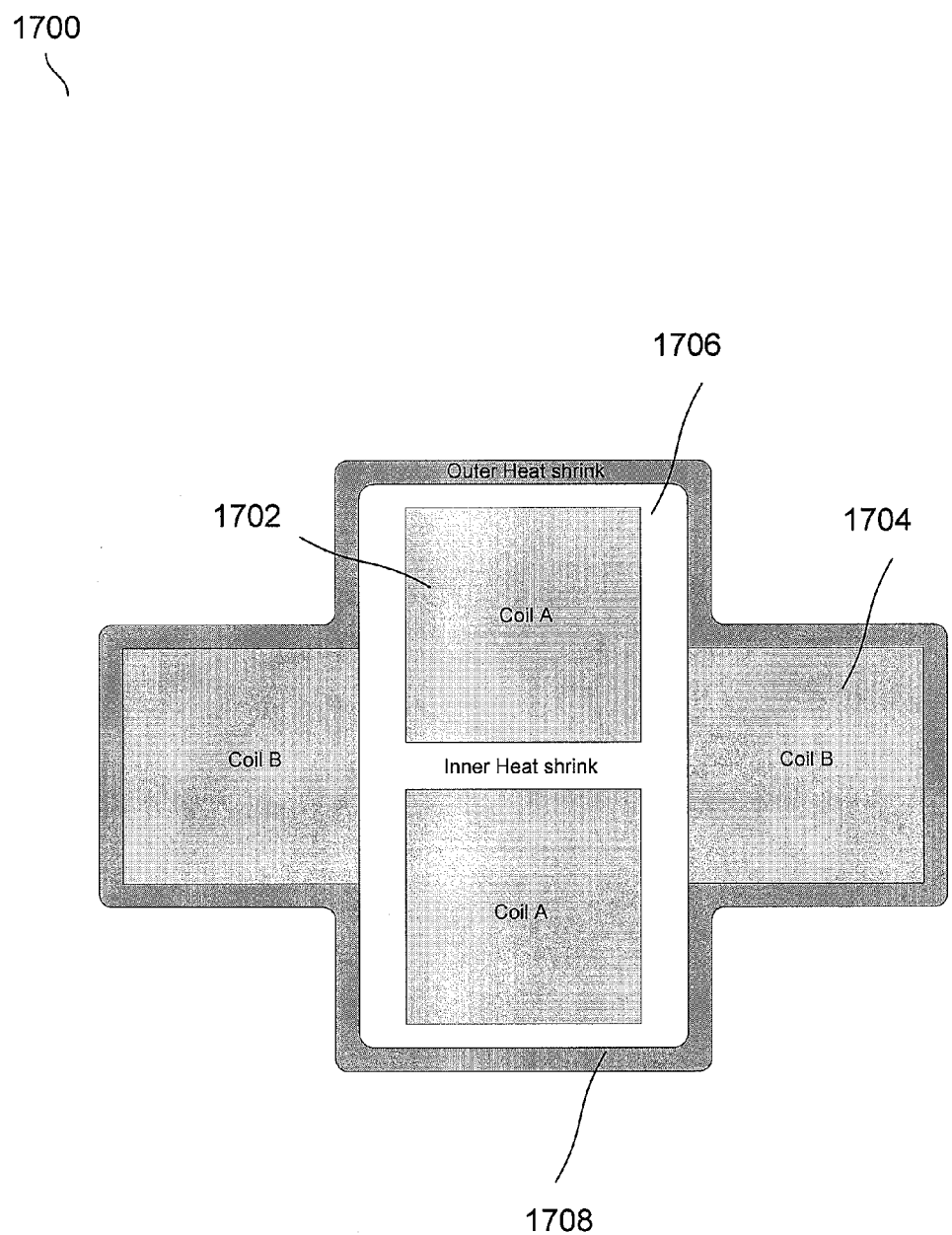
FIG. 17 is a diagram of a Type 1 inductance compensation technique applied to a bifilar coil.

FIG. 17 is a diagram of a Type 1 inductance compensation technique applied to a bifilar coil 1404*a* or 1408*a* (see FIG. 14) in accordance with some embodiments. As shown in FIG. 17, a strand 1702 is wound or wrapped in one or more turns around an inner heat shrink 1706. The strand 1704 is wound or wrapped in one or more turns around an outer heat shrink 1708 and over the strand 1702. Both the inner heat shrink 1706 and the outer heat shrink are used to keep the strands 1702 and 1704 in place together.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transmitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly transferring power from a charging power source to a device, the apparatus comprising:
   a first strand wound in one or more turns and operationally coupled to the charging power source;
   a second strand wound together with the first strand in one or more turns and operationally coupled to the charging power source; and
   an inductor circuit connected to the first strand and disconnected from the second strand, the inductor circuit configured to reduce a current difference between a first current flowing through the first strand and a second current flowing through the second strand.

2. The apparatus of claim 1, wherein the inductor circuit is configured to compensate for the current difference due to a difference in self-inductance of the first strand and the second strand.

3. The apparatus of claim 1, wherein at least one first segment of the first strand and at least one second segment of the second strand are placed in parallel with each other.

4. The apparatus of claim 1, wherein at least one first segment of the first strand and at least one second segment of the second strand are twisted, crossed over, or braided with each other.

5. The apparatus of claim 1, wherein the inductor circuit comprises a loop wire having a first end of the loop wire connected to a first end of the first strand and having a second end of the loop wire connected to a second end of the first strand.

6. The apparatus of claim 1, wherein the inductor circuit comprises an inductor having a first end of the inductor connected to a first end of the first strand and having a second end of the inductor connected to a second end of the first strand.

7. The apparatus of claim 1 further comprising a third strand wound in one or more turns and operationally coupled to the charging power source, wherein the inductor circuit is further configured to reduce at least another current difference between a third current flowing through the third strand and at least one of the first current and the second current.

8. The apparatus of claim 7, wherein the at least another current difference is at least in part caused by a mutual inductance imbalance between a first mutual inductance between the first strand and the third strand and a second mutual inductance between the second strand and the third strand.

9. The apparatus of claim 1 further comprising:
   a first lead operationally coupled to the first strand, the first lead placed on a first plane and around a first axis line that is perpendicular to the first plane; and
   a second lead operationally coupled to the second strand, the second lead placed on a second plane and around a second axis line that is perpendicular to the second plane.

10. The apparatus of claim 9, wherein the first plane is perpendicular to the second plane.

11. The apparatus of claim 9, wherein the first plane and the second plane are substantially the same.

12. The apparatus of claim 9, wherein the first plane is substantially parallel to the second plane.

13. The apparatus of claim 1 further comprising:
    an inner heat shrink around which the first strand is wound; and
    an outer heat shrink around which the second strand is wound.

14. The apparatus of claim 1, wherein the first strand and the second strand form a gap therebetween.

15. The apparatus of claim 1, wherein the first strand and the second strand are wound in respective positions that reduce the current difference.

16. An apparatus for wirelessly transferring power from a charging power source to a device, the apparatus comprising:
 a first strand wound in one or more turns and operationally coupled to the charging power source;
 a second strand wound together with the first strand in one or more turns and operationally coupled to the charging power source;
 a first transformer connected to the first strand and disconnected from the second strand; and
 a second transformer connected to the second strand and disconnected from the first strand, the first transformer and the second transformer configured to collectively reduce a current difference between a first current flowing through the first strand and a second current flowing through the second strand.

17. The apparatus of claim 16, wherein the first transformer and the second transformer are further configured to compensate for the current difference due to a difference in self-inductance of the first strand and the second strand.

18. The apparatus of claim 16, wherein at least one first segment of the first strand and at least one second segment of the second strand are placed in parallel with each other.

19. The apparatus of claim 16, wherein at least one first segment of the first strand and at least one second segment of the second strand are twisted, crossed over, or braided with each other.

20. The apparatus of claim 16 further comprising a third strand wound in one or more turns and operationally coupled to the charging power source, wherein at least one of the first transformer and the second transformer is further configured to reduce at least another current difference between a third current flowing through the third strand and at least one of the first current and the second current.

21. The apparatus of claim 20, wherein the at least another current difference is at least in part caused by a mutual inductance imbalance between a first mutual inductance between the first strand and the third strand and a second mutual inductance between the second strand and the third strand.

22. The apparatus of claim 16, wherein a first end of the first transformer is connected to a first end of the first strand, and wherein a second end of the first transformer is connected to a second end of the first strand.

23. The apparatus of claim 16, wherein the second transformer is connected in series with or parallel to the first transformer.

24. The apparatus of claim 16 further comprising a first power source connected to the first transformer, the first power source configured to be regulated to a voltage level that is sufficient to drive the first transformer and to reduce the current difference.

25. The apparatus of claim 24 further comprising a second power source connected to the second transformer, the first power source and the second power source configured to drive the first transformer and the second transformer and to reduce the current difference.

26. The apparatus of claim 25 further comprising:
 a third strand wound in one or more turns and operationally coupled to the charging power source; and
 a third transformer operationally coupled to the third strand, wherein the third transformer is configured to reduce at least another current difference between a third current flowing through the third strand and at least one of the first current and the second current.

27. The apparatus of claim 26, wherein the third transformer is connected in series with at least one of the first transformer and the second transformer.

28. The apparatus of claim 16, wherein at least one of the first transformer and the second transformer has a transformation ratio that is greater than 1 or less than 1.

29. A method of wirelessly power transfer from a charging power source to a device, the method comprising:
 transmitting power via a first strand wound in one or more turns and operationally coupled to the charging power source;
 transmitting power via a second strand wound together with the first strand in one or more turns and operationally coupled to the charging power source;
 providing power via an inductor circuit to the first strand, the inductor circuit connected to the first strand and disconnected from the second strand; and
 reducing a current difference between a first current flowing through the first strand and a second current flowing through the second strand.

30. The method of claim 29, wherein at least one first segment of the first strand and at least one second segment of the second strand are placed in parallel, twisted, crossed over, or braided with each other.

31. The method of claim 29, wherein providing the power via the inductor circuit to the first strand comprises providing the power via a loop wire to the first strand, the loop wire having a first end of the loop wire connected to a first end of the first strand and having a second end of the loop wire connected to a second end of the first strand.

32. The method of claim 29, wherein providing the power via the inductor circuit to the first strand comprises providing the power via an inductor to the first strand, the inductor having a first end of the inductor connected to a first end of the first strand and having a second end of the inductor connected to a second end of the first strand.

33. The method of claim 29, wherein transmitting the power via the first strand further comprises transmitting the power via a first lead operationally coupled to the first strand, the first lead placed on a first plane and around a first axis line that is perpendicular to the first plane, wherein transmitting the power via the second strand comprises transmitting the power via a second lead operationally coupled to the second strand, the second lead placed on a second plane and around a second axis line that is perpendicular to the second plane, wherein the first plane is different than, substantially perpendicular to or substantially parallel to the second plane.

34. The method of claim 29, wherein transmitting power via a first strand comprises wrapping an inner heat shrink around which the first strand is wound, wherein transmitting power via a second strand comprises wrapping an outer heat shrink around which the second strand is wound, wherein the first strand and the second strand form a gap therebetween, and wherein the first strand and the second strand are wound in respective positions that reduce the current difference.

35. A method of wirelessly power transfer from a charging power source to a device, the method comprising:
 transmitting power via a first strand wound in one or more turns and operationally coupled to the charging power source;
 transmitting power via a second strand wound together with the first strand in one or more turns and operationally coupled to the charging power source;
 providing power via a first transformer connected to the first strand, the first transformer disconnected from the second strand;

providing power via a second transformer connected to the second strand, the second transformer disconnected from the first strand; and
reducing a current difference between a first current flowing through the first strand and a second current flowing through the second strand.

36. The method of claim 35, wherein at least one first segment of the first strand and at least one second segment of the second strand are placed in parallel, twisted, crossed over, or braided with each other.

37. The method of claim 35, wherein a first end of the first transformer is connected to a first end of the first strand, and wherein a second end of the first transformer is connected to a second end of the first strand.

38. The method of claim 35, wherein the second transformer is connected in series with or parallel to the first transformer.

39. The method of claim 35 further comprising:
regulating a first power source to a voltage level that is sufficient to drive the first transformer and to reduce the current difference; and
regulating a second power source to another voltage level that is sufficient to drive the second transformer and to collectively reduce the current difference.

40. The method of claim 35, wherein at least one of the first transformer and the second transformer has a transformation ratio that is greater than 1 or less than 1.

41. An apparatus for wirelessly transferring power from a charging power source to a device, the apparatus comprising:
first means for transmitting wireless power to the device;
second means for transmitting wireless power to the device; and
means for reducing a current difference between a first current flowing through the first means for transmitting and a second current flowing through the second means for transmitting, the means for reducing connected to the first means for transmitting and disconnected from the second means for transmitting.

42. The apparatus of claim 41, wherein the first means for transmitting comprises a first strand, wherein the second means for transmitting comprising a second strand, and wherein at least one first segment of the first strand and at least one second segment of the second strand are placed in parallel, twisted, crossed over, or braided with each other.

43. The apparatus of claim 41, wherein the first means for transmitting comprises a first strand, wherein the second means for transmitting comprising a second strand, and wherein the means for reducing comprises a loop wire having a first end of the loop wire connected to a first end of the first strand and having a second end of the loop wire connected to a second end of the first strand.

44. The apparatus of claim 41, wherein the first means for transmitting comprises a first strand, wherein the second means for transmitting comprising a second strand, and wherein the means for reducing comprises an inductor having a first end of the inductor connected to a first end of the first strand and having a second end of the inductor connected to a second end of the first strand.

45. The apparatus of claim 41, wherein the first means for transmitting comprises a first strand and a first lead, the first lead operationally coupled to the first strand and placed on a first plane and around a first axis line that is perpendicular to the first plane, and wherein the second means for transmitting comprising a second strand and a second lead, the second lead operationally coupled to the second strand and placed on a second plane and around a second axis line that is perpendicular to the second plane.

46. The apparatus of claim 41, wherein the first means for transmitting comprises a first strand and an inner heat shrink, the inner heat shrink around which the first strand is wound, and wherein the second means for transmitting comprising a second strand and an outer heat shrink, the outer heat shrink around which the second strand is wound.

47. An apparatus for wirelessly transferring power from a charging power source to a device, the apparatus comprising:
first means for transmitting wireless power to the device;
second means for transmitting wireless power to the device;
first means for reducing a current difference between a first current flowing through the first means for transmitting and a second current flowing through the second means for transmitting, the first means for reducing connected to the first means for transmitting and disconnected from the second means for transmitting; and
second means for reducing the current difference connected to the second means for transmitting and disconnected from the first means for transmitting.

48. The apparatus of claim 47, wherein the first means for transmitting comprises a first strand, wherein the second means for transmitting comprising a second strand, and wherein at least one first segment of the first strand and at least one second segment of the second strand are placed in parallel, twisted, crossed over, or braided with each other.

49. The apparatus of claim 47, wherein the first means for transmitting comprises a first strand, wherein the second means for transmitting comprising a second strand, wherein the first means for reducing comprises a first transformer having a first end of the first transformer connected to a first end of the first strand and having a second end of the first transformer is connected to a second end of the first strand, wherein the second means for reducing comprises a second transformer having a first end of the second transformer connected to a first end of the second strand and having a second end of the second transformer connected to a second end of the second strand, and wherein the second transformer is connected in series with or parallel to the first transformer.

50. The apparatus of claim 47, wherein the first means for transmitting comprises a first strand, wherein the second means for transmitting comprising a second strand, wherein the first means for reducing comprises a first transformer and a first power source, the first power source configured to generate a voltage level that is sufficient to drive the first transformer and to reduce the current difference, and wherein the second means for reducing comprises a second transformer and a second power source, the second power source configured to generate another voltage level that is sufficient to drive the second transformer and to collectively reduce the current difference.

51. The apparatus of claim 47, wherein the first means for reducing comprises a first transformer, wherein the second means for reducing comprises a second transformer, and wherein at least one of the first transformer and the second transformer has a transformation ratio that is greater than 1 or less than 1.

* * * * *